No. 840,941. PATENTED JAN. 8, 1907.
F. C. HOWE.
SCOOP.
APPLICATION FILED MAY 23, 1906.

WITNESSES

INVENTOR
Frank C. Howe
BY
ATTORNEYS

UNITED STATES PATENT OFFICE.

FRANK C. HOWE, OF EL PASO, TEXAS.

SCOOP.

No. 840,941. Specification of Letters Patent. Patented Jan. 8, 1907.

Application filed May 23, 1906. Serial No. 318,322.

*To all whom it may concern:*

Be it known that I, FRANK C. HOWE, a citizen of the United States, and a resident of El Paso, in the county of El Paso and State of Texas, have invented a new and Improved Scoop, of which the following is a full, clear, and exact description.

This invention relates to scoops such as used in stores and similar places for handling flour, sugar, or similar materials.

The object of the invention is to provide a scoop of simple construction, having a handle or bail attached thereto, with means for determining the weight of the contents of the scoop.

The invention consists in the construction and combination of parts to be more fully described hereinafter and particularly set forth in the claims.

Reference is to be had to the accompanying drawings, forming a part of this specification, in which similar characters of reference indicate corresponding parts in all the views.

Figure 3:
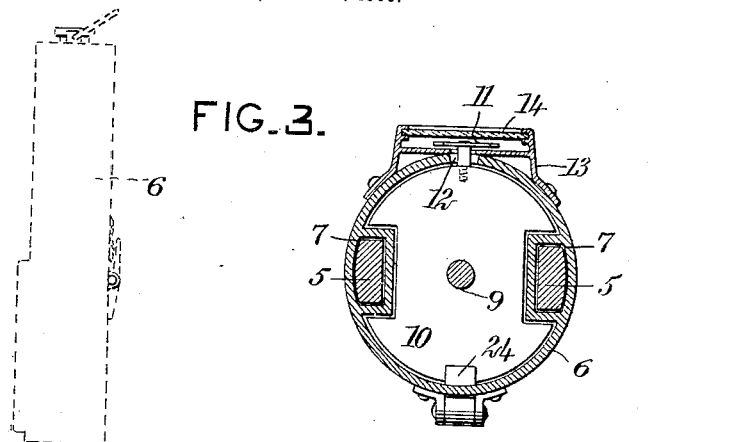
Figure 1:
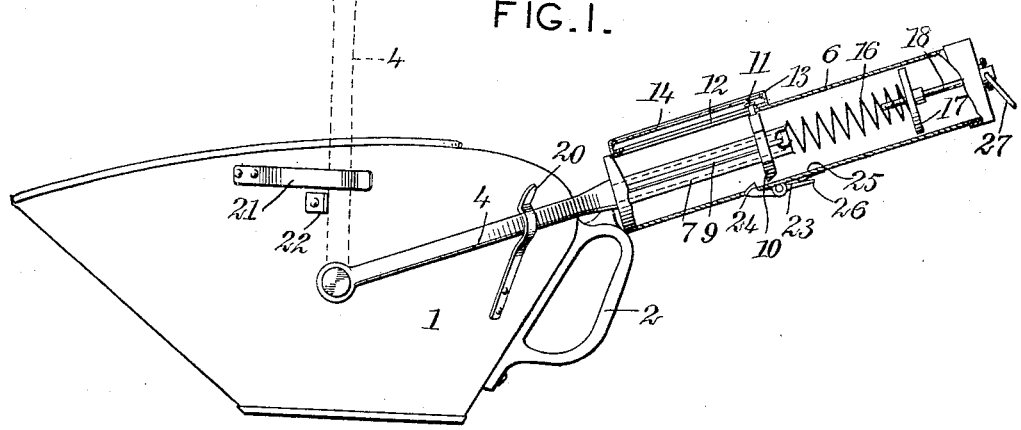
Figure 2:
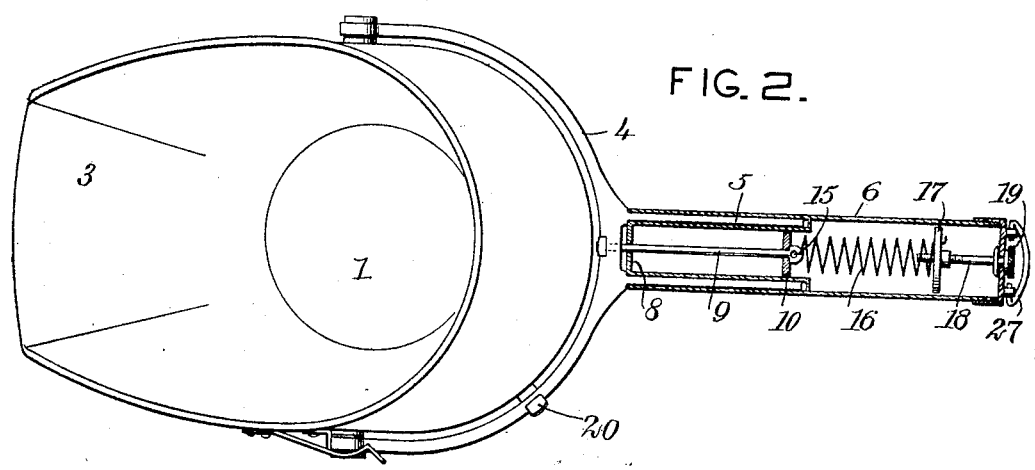

Figure 1 is a side elevation of the scoop, a portion of the handle thereof being shown in cross-section. In this view the handle and bail of the scoop are represented in dotted outline in the vertical position which they assume when the contents of the pan of the scoop are being weighed. Fig. 2 is a plan of the scoop, the handle thereof being represented in longitudinal section; and Fig. 3 is a cross-section through the handle of the scoop, taken at the scale. This view is upon an enlarged scale.

Referring more particularly to the parts, 1 represents the body or pan of the scoop, and this pan may have substantially the form shown, having a loop-handle 2 on one of the sides thereof and having an inclined or extended lip 3 opposite this handle, as shown. Near the central line of the pan a bail 4 is pivotally attached on opposite sides of the pan, as indicated. This bail is of curved form, as shown in Fig. 2, and at or near its middle point it is provided with outwardly-projecting forks 5. These forks are disposed parallel with each other, as shown. Upon these forks a tubular handle 6 is adapted to slide, said forks 5 being received in guideways 7, formed longitudinally in the handle, as shown most clearly in Figs. 2 and 3. Through the inner end 8 of the handle 6 a runner 9 is guided longitudinally, said runner being fixed to the bail, as indicated. This runner simply consists of a rod, near the outer extremity whereof a head 10 is attached, and this head is provided with a laterally-projecting pointer 11, which runs in a longitudinal slot 12, formed in the upper side of the tubular handle 6, as shown most clearly in Fig. 3. Over this slot 12 a pointer-case 13 is attached, which consists of a metal frame within which the pointer slides, as indicated, the said frame being provided with a glass scale 14. This scale coöperates with the pointer, as will be readily understood. Beyond the head 10 of the runner the runner is formed with an eye 15, to which there is attached a coiled or helical spring 16. This spring extends longitudinally in the handle, as shown, and is attached at its outer extremity to an adjusting-head 17, which head is carried upon an adjusting-screw 18. The outer extremity of the adjusting-screw 18 carries a thumb-head 19, which is adapted to be rotated to adjust the tension of the spring.

On the rear side of the pan 1 I provide a clip 20, which is preferably of resilient material, and this clip is adapted to engage the bail 4, as indicated in Fig. 1, so as to maintain the handle 6 in a convenient position to use the scoop. A similar spring-clip 21 is provided near the upper portion of the pan 1, which affords means for holding the bail 4 in a substantially vertical position, such as that in which it is represented in dotted outlines in Fig. 1. In order to assist in securing the bail in this position, I provide the side of the pan with a stop 22, against which the edge of the bail abuts when held by the clip 21, as shown. The tubular handle 6 is provided with a catch 23, having a nib 24, which projects into the interior thereof, being adapted to engage the edge of the head 10 in order to limit the downward movement thereof, as will appear very clearly from inspection of Fig. 1. A spring 25 normally holds this catch in its operative position; but the catch presents a projecting toe 26, which is adapted to be depressed by one's finger in order to withdraw the nib 24 for a purpose which will appear more fully hereinafter.

In using the device to scoop up material the handle 6 is held in substantially the position shown in Fig. 1. When the contents of the pan 1 are to be weighed, the bail 4 will be released from the rear clip 20 and will be moved into a substantially vertical plane, in which it will be held by the clip 21. The catch 23 is then released in the manner suggested, so that the weight in the pan will extend the spring 16. The amount of extension of this spring will be proportionate with the weight in the pan and will be read upon the scale 14. In this way the contents of the pan may be correctly weighed, and no necessity arises for the ordinary operation of weighing the material by placing the same in a counter-scale or similar device.

In order to enable the tubular handle 6 to be conveniently held while the weighing operation is taking place, I provide the end of the handle with a loop 27, of wire or similar material. This loop also enables the scoop to be suspended from a nail or similar support when not in use.

Having thus described my invention, I claim as new and desire to secure by Letters Patent—

1. In a device of the class described, in combination, a pan, a bail pivotally attached thereto, a handle slidably mounted on said bail, a spring connecting said handle with said bail, a scale coöperating with said bail and said handle to constitute a weighing device, and means for locking said bail to said pan in a position at or near the vertical axis of said pan, and means for locking said bail in a laterally-disposed position.

2. In a device of the class described, in combination, a pan, a bail pivotally attached to said pan, a handle slidably mounted on said bail, a runner attached to said bail, a spring connecting said runner with said handle, said runner having a pointer, means for locking said runner to said handle, a scale coöperating with said pointer, and resilient clips attached to said pan and affording means respectively for locking said bail in a substantially central position and in a laterally-disposed position.

3. In a device of the class described, in combination, a pan, a bail pivotally attached to said pan and having outwardly-projecting forks, a handle slidably mounted on said forks, a runner carried by said bail, a spring connecting said runner with said handle, said runner having a pointer, means for locking said runner to said handle, a scale on said handle coöperating with said pointer, and means respectively carried by said pan for holding said bail in a substantially central position and in a laterally-disposed position.

In testimony whereof I have signed my name to this specification in the presence of two subscribing witnesses.

FRANK C. HOWE.

Witnesses:
JOHN F. MITCHELL,
ROBERT C. WALSHE.